United States Patent
Hallam et al.

(10) Patent No.: US 10,474,555 B2
(45) Date of Patent: Nov. 12, 2019

(54) DETECTING ERRORS FOR FUNCTION CALLS WITH AN IMPLICIT RECEIVER OBJECT

(71) Applicant: Synopsys, Inc., Mountain View, CA (US)

(72) Inventors: Peter Hallam, Burien, WA (US); Brett van Swelm, Bellevue, WA (US); Peter Dillinger, Seattle, WA (US)

(73) Assignee: Synopsys, Inc., Mountain View, CA (US)

( * ) Notice: Subject to any disclaimer, the term of this patent is extended or adjusted under 35 U.S.C. 154(b) by 40 days.

(21) Appl. No.: 15/449,851

(22) Filed: Mar. 3, 2017

(65) Prior Publication Data
US 2017/0255543 A1 Sep. 7, 2017

Related U.S. Application Data

(60) Provisional application No. 62/303,185, filed on Mar. 3, 2016.

(51) Int. Cl.
*G06F 11/36* (2006.01)
(52) U.S. Cl.
CPC ...... *G06F 11/3604* (2013.01); *G06F 11/3624* (2013.01); *G06F 11/3688* (2013.01)
(58) Field of Classification Search
CPC ............. G06F 11/3624; G06F 11/3688; G06F 11/3604
See application file for complete search history.

(56) References Cited

U.S. PATENT DOCUMENTS

| 5,581,696 | A | * | 12/1996 | Kolawa | G06F 11/3624 |
| | | | | | 714/38.1 |
| 5,822,589 | A | * | 10/1998 | Diamant | G06F 11/3604 |
| | | | | | 717/131 |
| 6,523,137 | B1 | * | 2/2003 | Stone | G06F 11/3672 |
| | | | | | 714/37 |
| 7,496,898 | B1 | * | 2/2009 | Vu | G06F 9/4484 |
| | | | | | 717/127 |
| 9,141,520 | B2 | * | 9/2015 | Zheng | G06F 11/3676 |
| 9,342,440 | B2 | * | 5/2016 | Zheng | G06F 11/3676 |
| 2004/0003375 | A1 | * | 1/2004 | George | G06F 11/3466 |
| | | | | | 717/124 |
| 2007/0217679 | A1 | * | 9/2007 | Ito | G06F 9/4484 |
| | | | | | 382/181 |

(Continued)

*Primary Examiner* — Viva Miller
(74) *Attorney, Agent, or Firm* — Fenwick & West LLP

(57) ABSTRACT

A code testing system identifies possible code errors that may generate unexpected application behaviors. The code testing system identifies function calls in the system by identifying function call sites that do not specify a receiver object but may invoke a function that uses a receiver object. To identify these call sites, the code testing system analyzes function operation to determine receiver functions that use a receiver object, and may exclude functions that use the receiver object in a pro forma way or that does not rely on or affect properties of the object. A callgraph is generated for the functions in the code to identify possible functions called from a call site. When a call site, based on the callgraph, may invoke a receiver function, the call site is analyzed to determine whether it specifies a receiver object for the called function and identifies an error when the call site does not specify a receiver object.

20 Claims, 3 Drawing Sheets

(56) References Cited

U.S. PATENT DOCUMENTS

| | | | |
|---|---|---|---|
| 2009/0119649 A1* | 5/2009 | Jegoulev | G06F 8/437 717/131 |
| 2010/0058300 A1* | 3/2010 | Zeng | G06F 11/3676 717/131 |
| 2015/0007140 A1* | 1/2015 | Boshernitsan | G06F 11/3688 717/124 |
| 2015/0039480 A1* | 2/2015 | Jin | G06Q 30/04 705/34 |
| 2015/0121345 A1* | 4/2015 | Muske | G06F 11/3664 717/125 |
| 2016/0259715 A1* | 9/2016 | Zheng | G06F 11/3676 |

* cited by examiner

DETECTING ERRORS FOR FUNCTION CALLS WITH AN IMPLICIT RECEIVER OBJECT

CROSS REFERENCE TO RELATED APPLICATIONS

This application claims the benefit of provisional application No. 62/303,185, filed Mar. 3, 2016, the entirety of which is hereby incorporated by reference.

BACKGROUND

This invention relates generally to identifying software errors, and particularly to detecting errors when calling a function without specifying a receiver object.

A popular feature in programming languages is for subroutines (usually called methods or functions) to have an implicit parameter called 'this.' Often called the receiver or receiver object, the 'this' parameter is conceptually the object on which a function is performed. For example, when calling the Show function for a Window, a programmer may pass a Window as its 'this' parameter.

Some languages, such as ECMAScript, also known as JavaScript, have a feature in which specifying no 'this' parameter in a function call implicitly binds the 'this' parameter to a special value. Though this usage will execute, authors of functions that use the 'this' parameter rarely expect such a special value; thus, failing to specify an explicit 'this' parameter in calling some functions may be a mistake that can lead to a variety of unexpected program behaviors. Software defects are costly in impact and costly to correct after first introduction, so detecting mistakes in programming is valuable.

Commercial static analysis tools are software packages that run static analyses on other software, and commonly report results in the form of defects discovered in the analyzed software.

SUMMARY

A code testing system detects cases in which an explicit 'this' parameter (or other receiver object) is omitted for functions that use a receiver object. This enables detecting many of these errors based on analysis of the written code, and may detect such errors before execution-based testing and does not impose any new coding conventions on the programmer.

The code testing system identifies function call sites in a program and reports a defect when a function call site with no explicit 'this' parameter that might invoke a function that should be invoked with an explicit 'this' parameter. Since the functions to be called at a given location in the code may vary, the identified call sites are analyzed to determine if they may call a function that uses a 'this' parameter. Functions that use the 'this' parameter are termed "receiver functions." This depends on two sub-analyses. The first analysis identifies receiver functions that use the 'this' parameter in its operation and therefore may meaningfully be impacted when the 'this' parameter is not expressly specified (i.e., and would otherwise be executed with an implicit 'this' parameter). The second analysis generates a callgraph to identify which functions may be called at function call sites in the code. The functions at each call site identified by the callgraph are identified to identify when a call site may invoke a receiver function. When a call site may invoke a receiver function, the call site is analyzed to determine whether it specifies an object to be the receiver object for the function. When there is no specified parameter for a receiver object for a call site that may invoke a receiver function, a possible error is identified in the code at the call site.

The first sub-analysis looks at function definitions in a program and infers that a defined function should be invoked with an explicit 'this' parameter if the body of the function uses the 'this' parameter in a meaningful way. To determine whether the function should be called with a receiver object, functions are first identified that recite the receiver object (i.e., recite the "this" object). Next, these may be filtered or pruned to exclude various uses that do not functionally incorporate or use the receiver object. As one example, any use of 'this' that follows a known pattern of pro forma uses, such as the code "return this;" which simply passes the 'this' value back to the caller of the function as a return value without accessing any members of 'this'. Functions that only recite "return this" or other non-meaningful uses of the receiver object are excluded in the set of receiver functions. In addition, uses of the receiver object that use a global variable associated with a receiver object may also not constitute a functional use of the receiver object and would not identify the function as a receiver function. As another alternative, a function may be included if it retrieves a value for or affects a variable specific to an instance of a receiver object. These meaningful uses of the receiver object may include public or private variables of the receiver object that are affected by the instance of the receiver object.

The second sub-analysis is a callgraph analysis for associating function call sites with definitions of functions that might be called from that call site. The functions that could be called at a call site are termed called functions. In some alternatives, the determination of receiver functions is performed in any order with respect to the determination of a callgraph and called functions at a call site. In other embodiments, the callgraph may be determined first, and the functions which actually may be called at the call sites are analyzed to determine the receiver functions.

Using the callgraph analysis, the call sites for which a receiver function may be called is identified as a candidate call site for an error in the code. At these call sites, code is analyzed to determine whether the function is called with an express receiver object, and when no receiver object is specified, an error may be generated for the candidate call site.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
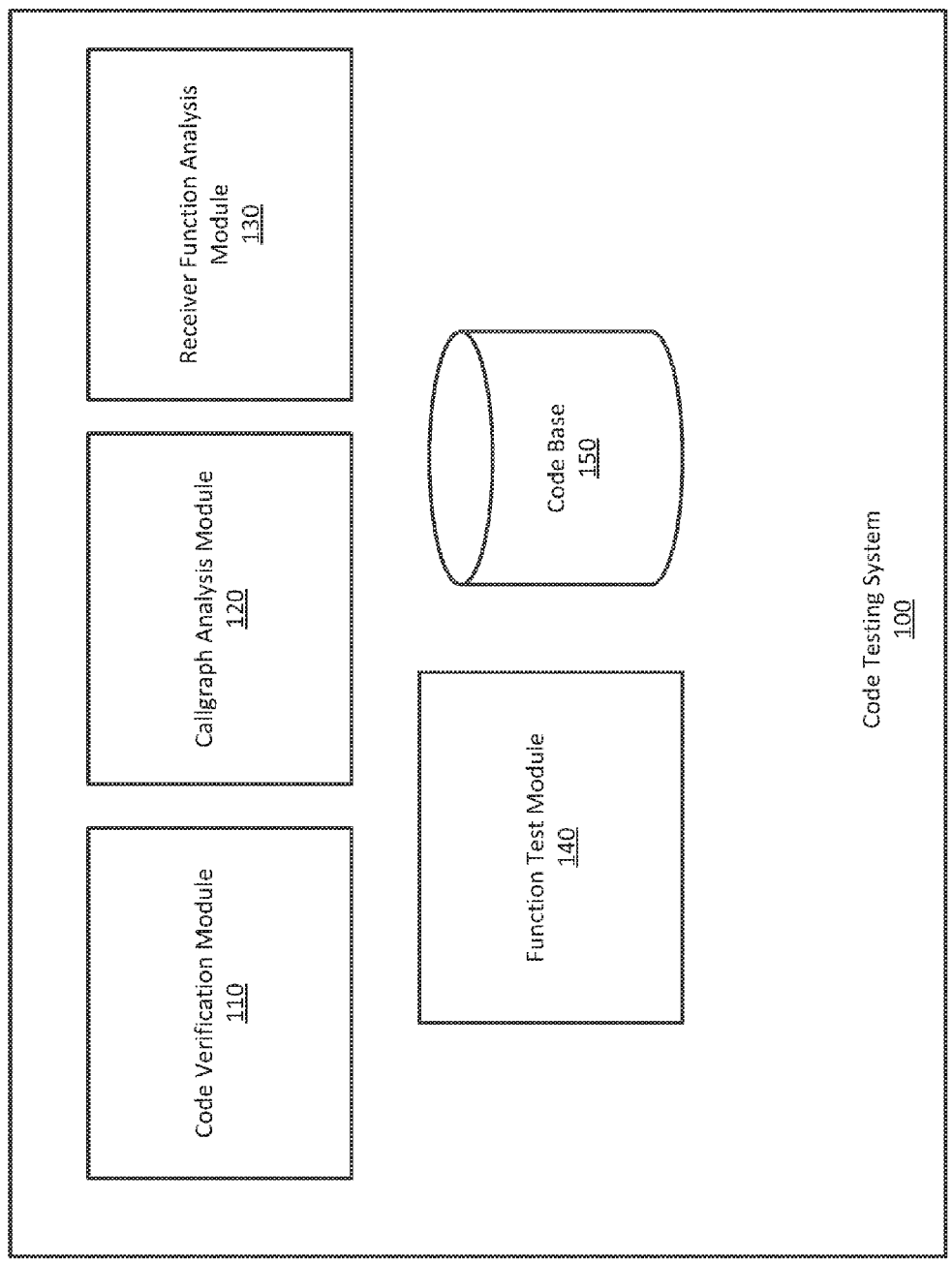
FIG. 1 shows an example code testing system 100 for analyzing errors in computer code.

FIG. 1 shows an example code testing system 100 for analyzing errors in computer code. The code testing system 100 applies code testing to a code base 150 to determine errors in the code base 150, and may include static analysis of the computer code. Static analysis includes methods and algorithms for deriving facts and heuristic inferences about computer programs without actually running those programs. The code testing system 100 uses static analysis to determine whether analyzed code in the code base 150 includes an implicit use of a receiver object for a function that meaningfully uses the receiver object in its function. That is, the code testing system 100 identifies receiver functions that use the receiver object and function call sites at which these receiver functions are called without specifying a receiver object. The code testing system 100 includes a code verification module 110, a callgraph analysis module 120, and a receiver function analysis module 130 and a function test module 140 to determine whether a function that uses a receiver object may be called without specifying a receiver object. Because in some programming languages this may be proper syntax and even execute correctly in many circumstances, an error may not be easily detected and difficult to identify in the program code.

The code verification module 110 may receive a request from a user to test a portion of code in the code base 150. The code base 150 may include portions of code in a programming language for testing and analysis by the code testing system 100. The user may specify to the code verification module 110 a specific portion of code or other portion of a program to test. The code verification module 110 analyzes the code base 150 in conjunction with other components of the code testing system 100 to provide likely errors in the code to the user. These errors may be identified based on the code base 150 itself, without requiring the dynamic execution of the program. Errors may also be identified with various dynamic and operational testing of the program. The operations described herein to identify errors may be included in a suite of tests performed by the code testing system 100 and orchestrated by the code verification module 110. Additional modules for performing these additional features are not shown herein for convenience.

After designation of portions of the code base 150, the code verification module 110 identifies a set of functions for the requested test. To identify what functions may be called by the functions to be tested (e.g., those of a program or other application), the code verification module 110 passes the set of functions and its associated code in the code base 150 to the callgraph analysis module 120.

The callgraph analysis module 120 generates a callgraph for the set of functions in the analyzed code. The callgraph analysis module 120 performs callgraph analysis to determine a set of call sites in the set of functions and which function definitions might be called from each specific function call site. Thus, the result of the callgraph analysis is a callgraph, which designates, for each location in the code that calls a function, termed a call site, what functions may be called from that call site. The called functions may be a part of the selected set of functions for testing by the user, and may also include functions from libraries and other functions externally referenced to the selected set of functions for testing.

The callgraph analysis module 120 generates a callgraph in various ways according to its implementation. There are many ways to perform callgraph analysis. Callgraph analyses are typically based on an iterative data flow analysis. This iterative analysis initializes by assuming there are no known possible values of program variables and other program elements, such as functions to be called at a call site. The callgraph analysis steps through code for the program and derives facts about possible values of program variables, as in concluding "x can be 2" from "x=2", and as more code is examined, the analysis is able to derive more facts based on those already determined, as in "y can be 2" from "y=x". The iterative nature of these inferences imply more is learned with more iterations over all the code in the program; an analysis is either kept to a fixed number of iterations or is iterated to a fixed point, when a complete iteration infers no more facts about the program. The facts determined about the program element used as a function in each function call are the results of the callgraph analysis. For example, function "g" is defined based on function "f" in this example:

```
function f(x) {
  return function (y) { return x + y; }
}
var g = f(1);
g(41);
```

In this example, anonymous function definition, "function (y) {return x+y;}" is found to be a possible target of the function call "g(41)", because g is assigned from the return value of a call to f, and f returns "function (y) {return x +y;}" in its definition. The statement "g(41)" is a call site at which function "f" and function definition "function (y) {return x+y;}" are functions that may be called to resolve function "g". In practice, functions invoked at a call site may include many different types of functions, may be anonymous, may invoke libraries, and may invoke functions of objects or other instanced structures in the program. As discussed herein, these invoked functions may rely on a receiver object. After determining the callgraph to identify call sites and the set of called functions for each call site, the callgraph analysis module provides the callgraph to the code verification module 110.

Using the callgraph analysis, the code verification module 110 provides the possible functions called by the set of functions (in the code selected for testing) to the receiver function analysis module 130, which determines whether the called functions use a receiver object and may generate unexpected behavior if the called function is invoked without an explicit receiver object. In other embodiments, the function analysis module 130 analyzes functions of the program to determine receiver functions without receiving the callgraph from the code verification module. In this example, the function analysis module 130 may analyze the set of selected functions of the program, along with functions associated with libraries or other functions included with the execution of the program.

The receiver function analysis module 130 identifies a set of receiver functions that that may be used by the tested program or set of functions. This set of receiver functions may be analyzed to determine which functions meaningfully use the receiver object in the function. To identify these receiver functions, the receiver function analysis module 130 identifies those functions in the set of called functions for the code that recite the receiver object, meaning that the code for the function mentions the receiver object, such as a variable, argument, parameter, or other part of the receiver object. For example, any use of the "this" parameter may be initially construed as identifying a function as a "receiver function."

The way in which the receiver object is used may further determine whether the function is should be treated as a receiver function. For the receiver functions, the use of the receiver function is analyzed to determine if the use of the receiver function is meaningful. Stated another way, the set of receiver functions is filtered or pruned to exclude the receiver functions that do not functionally incorporate the receiver object in the function's operation. This functional incorporation may exclude functions that only use pro-forma or non-meaningful uses, while including those functions as receiver functions when the receiver object is used in the operation of the function. Some functions that may be excluded as receiver functions may not use any properties of the receiver object in its operation, or may merely pass the receiver object to another function.

Examples of such uses that are not meaningful, (i.e., they do not functionally incorporate the receiver function) include:
  Returning this:
    return this;
  Passing "this" as "this" to a function passed in as a parameter (some_fn): some_fn.apply(this, args);
  Accessing a property of "this" that is known to be a global variable: this.document Other examples of meaningful or "functional" uses of the receiver object include:
  Calling a receiver object function:
    this.fn( );
  Retrieving a variable from a receiver object:
    var=this.variable;
  Setting a variable for a receiver function:
    this.variable=var In some examples, the function or variable of a receiver function is analyzed to determine whether the function or variable can be determined to affect a global variable or function of the receiver object and does not depend on an instance of the receiver object. For example, a called function may be associated with a "Window" class, such as Window.ScreenSize( ). This function may include a function to provide the screensize of the display in which the executing program operates, and may not depend on an instance of the "Window" class. When a called function specifies Window.DisplaySize( ) this function may be analyzed to determine that it uses a function or variable that is global to the Window class. As a contrasting example, Window.WindowSize( ) may specify the size of a specific window in an instance of a class, and in its function access private variables of the instantiated Window. The Window.WindowSize( ) function thus may be determined to use instantiated variables. When a function recites use of global characteristics, such as this.DisplaySize( ), the function may not meaningfully use the "this" receiver object (and thus may not be identified as a receiver function), while a function that recites use of instance-based characteristics, such as this.WindowSize( ), is identified as a receiver function.

The receiver function analysis module 130 thus designates a set of receiver functions to identify those functions which meaningfully use the receiver object. The set of receiver functions may be determined from the set of called functions from each call site in the callgraph. In one example, the call sites that recite the user of receiver functions are termed candidate call sites to designate that these are call sites that are candidates for generating an error. The set of receiver functions is returned to the code verification module 110. The code verification module provides the set of receiver functions and the candidate call sites from the set of functions to the function test module 140 to determine whether the candidate call sites fail to recite a receiver function.

The function test module 140 determines whether to generate an error for function call sites that include a receiver function in the called functions for the candidate call site. The function test module 140 receives the set of candidate call sites and determines whether the possible call to a receiver function does so with a receiver object. Using the callgraph, the function test module 140 identifies the call sites at which a receiver function may be invoked (to identify the candidate call cites) and analyzes whether the candidate call site recites the receiver object for those call sites at which a receiver object is expected.

The methods for reciting a receiver object may differ according to the programming language. In one example, the receiver object is explicitly recited when the receiver function is called as an element of the receiver object, for examples using "this":
  Here is an example of a function call with an explicit 'this' argument:
    obj.func(42);
  The function called is the 'func' member of 'obj', and the 'this' argument is 'obj'.
  Another way to invoke a function with an explicit "this" parameter is with the "apply" or "call" built-in function, as in
    var my_func=obj.func;
    my_func.apply(obj, 42);
  or
    var my_func=obj.func;
    my_func.call(obj, 42);
  which perform the same invocation as
    obj.func(42);
  Here is an example of a function call which does not specify (i.e., only implicitly) a 'this' receiver object:
    var my_func=obj.func;
    my_func(42);
  In this case, 'my_func' is bound to the same function as 'obj.func', but there is no 'this' specified in the call to 'my_func'. In this implicit definition, executing the statement 'my_func(42);' may perform the function of obj.func without an object of type 'obj' to act as the receiver object in the function.

After determining whether a call site specifies a receiver object for a receiver function, an error is generated for those candidate function call sites that do not specify a receiver object. The function test module 140 reports the errors for these call sites to the code verification module 110. This error may be reported to the user by the code verification module 110, or otherwise reported as a part of a code checking routine. By determining which functions are receiver functions and actually use the receiver object, and at what call sites the receiver functions may be called, the code testing system 100 can identify when a user neglected to specify the receiver object for programming languages that otherwise may not provide any error for this.

Figure 2:
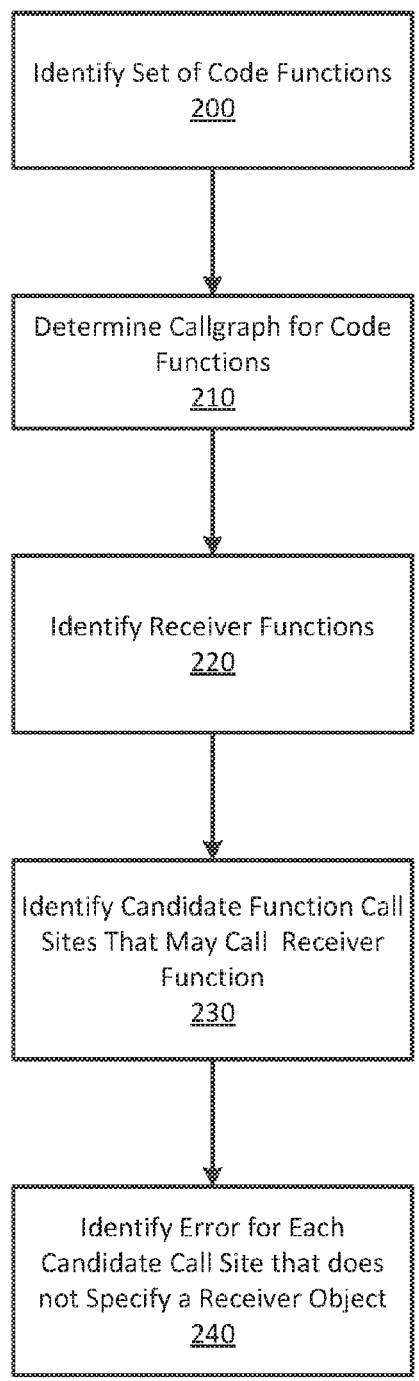
FIG. 2 shows a sample method for detecting code errors that call functions without an explicit receiver object according to one embodiment.

FIG. 2 shows a sample method for detecting code errors that call functions without an explicit receiver object according to one embodiment. Initially, a set of code functions are identified 200 for error testing. Next, a callgraph analysis is performed to determine 210 a set of function call sites in the set of functions and, for each function call cites, the set of called functions that may be called from the call sites within the set of code functions. Next, the receiver functions that recite a receiver object are identified 220, which may be determined from the set of called functions and call sites. The set of receiver functions may be identified by filtering or selecting functions that include interactions with the receiver object that use the receiver object in a nontrivial way. For example, the set of receiver functions may be filtered to exclude those functions that only recite the receiver object in a pro forma way or otherwise do not use properties of the receiver object or an instance of the receiver object in the operation of the function that recites a receiver object. Once the receiver functions are identified for which a receiver object is expected, the call sites that may call the receiver function are identified 230 as candidate function call sites by identifying call sites that include receiver functions in the associated called functions for the call site. These call sites are analyzed to determine whether the call site specifies a receiver object, and identifies or generates an error for the candidate call sites that do not specify a receiver object. The error may indicate to a programmer or other user that there is a possible problem at the candidate call site because that site may call a function that recites the nontrivial use of a receiver object.

Figure 3:
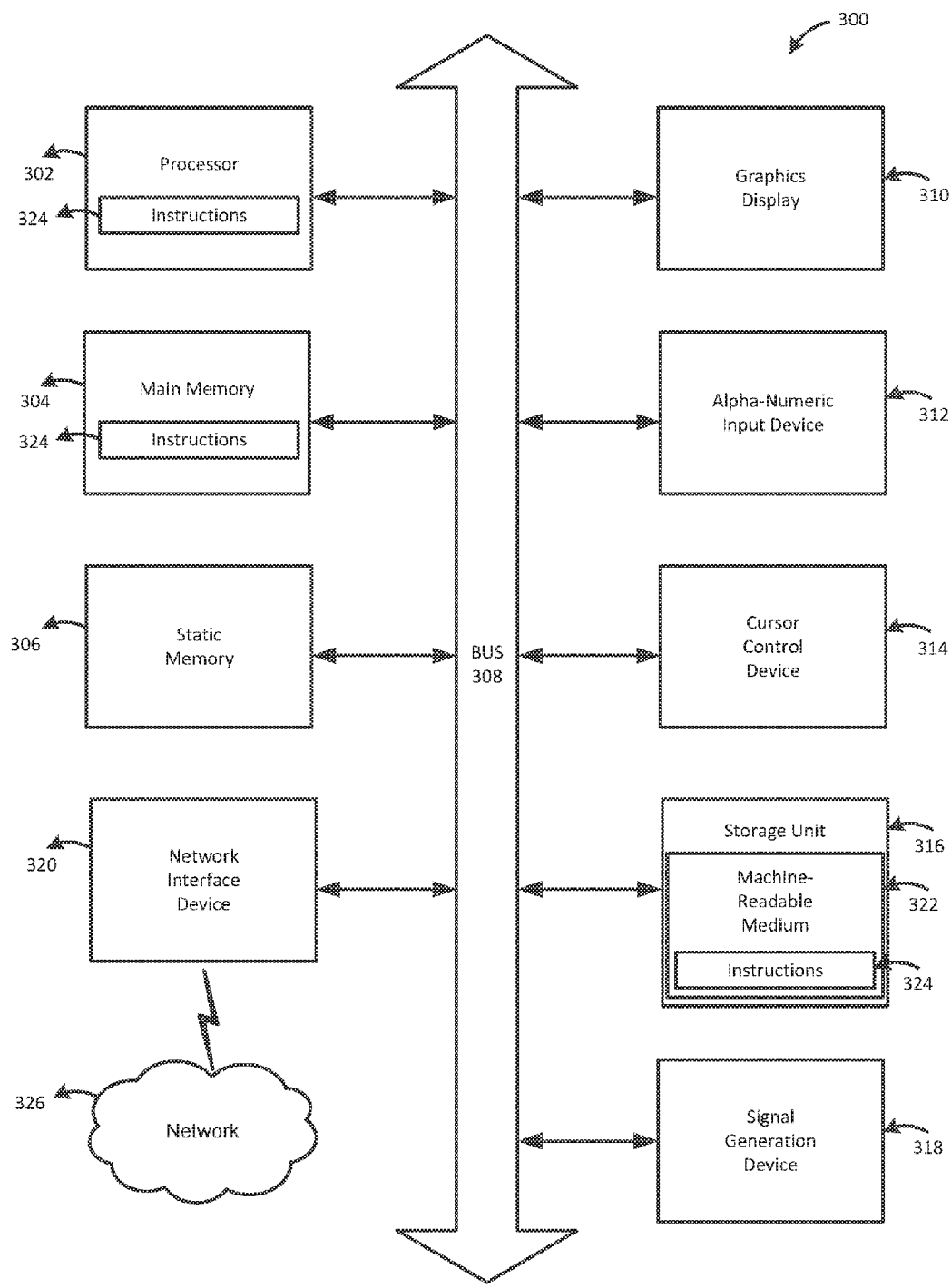
FIG. 3 illustrates components of an example machine that reads instructions from a machine-readable medium and execute them in a processor (or controller), according to one embodiment.

FIG. 3 is a block diagram illustrating components of an example machine able to read instructions from a machine-readable medium and execute them in a processor (or controller). The code testing system 100 may be implemented in an example machine as shown in FIG. 3, and such an example machine may also describe an example machine on which the code included in code base 150 may be executed. Specifically, FIG. 3 shows a diagrammatic representation of a machine in the example form of a computer system 300 within which instructions 324 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include graphics display unit 310 (e.g., a plasma display panel (PDP), a liquid crystal display (LCD), a projector, or a cathode ray tube (CRT)). The computer system 300 may also include alphanumeric input device 312 (e.g., a keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for detecting errors in computer code, comprising:
   identifying, by a processor, a set of functions in computer code in a programming language for execution by a computer, the programming language of the computer code permitting the use of receiver objects for functions in the programming language without explicitly specifying the receiver object;
   generating, by the processor, a callgraph for the set of functions in the computer code, the callgraph identifying a set of function call sites in the set of functions and for each function call site a set of called functions that could be invoked from the function call site during execution of the computer code by the computer, wherein the callgraph is generated for each function call site by identifying possible functions for the call cite and iteratively determining additional possible functions based on the identified possible functions;
   identifying, by the processor, a set of receiver functions that recite a receiver object in the function;
   identifying, by the processor, from the set of function call sites, a set of candidate function call sites that include a receiver function of the set of receiver functions in the set of called functions identified in the callgraph for the function call site;
   determining whether each candidate function call site in the set of candidate function call sites specifies a receiver object parameter; and
   for each candidate function call site, identifying, by the processor, an error in the computer code at each candidate function call site when the candidate function call site does not specify a receiver object parameter.

2. The method of claim 1, wherein identifying the set of called functions comprises filtering the set of receiver functions to exclude functions that do not functionally incorporate the receiver object in the computer code for the receiver function.

3. The method of claim 2, wherein excluding function that do not functionally incorporate the receiver object comprises excluding functions that do not use an instance-specific variable of the receiver object in the function.

4. The method of claim 2, wherein excluding functions that do not functionally incorporate the receiver object comprises excluding functions that use only global variables of the receiver object in the function.

5. The method of claim 2, wherein excluding functions that do not functionally incorporate the receiver object comprises excluding functions that include only pro forma uses of the receiver object.

6. The method of claim 1, wherein identifying the set of receiver functions comprises identifying receiver functions from the set of called functions.

7. The method of claim 1, wherein the error indicates the candidate call site recites a nontrivial use of the receiver object.

8. A non-transitory computer-readable medium including instructions for execution on a processor, the instructions, when executed by the processor, causing the processor to:
   identify, by a processor, a set of functions in computer code in a programming language for execution by a computer, the programming language of the computer code permitting the use of receiver objects for functions in the programming language without explicitly specifying the receiver object;
   generate, by the processor, a callgraph for the set of functions in the computer code, the callgraph identifying a set of function call sites in the set of functions and for each function call site a set of called functions that could be invoked from the function call site during execution of the computer code by the computer, wherein the callgraph is generated for each function call site by identifying possible functions for the call site and iteratively determining additional possible functions based on the identified possible functions;
   identify, by the processor, a set of receiver functions that recite a receiver object in the function;
   identify, by the processor, from the set of function call sites, a set of candidate function call sites that include a receiver function of the set of receiver functions in the set of called functions identified in the callgraph for the function call site;
   determine whether each candidate function call site in the set of candidate function call sites specifies a receiver object parameter; and
   for each candidate function call site, identify, by the processor, an error in the computer code at each candidate function call site when the candidate function call site does not specify a receiver object parameter.

9. The non-transitory computer-readable medium of claim 8, wherein identifying the set of called functions comprises filtering the set of receiver functions to exclude functions that do not functionally incorporate the receiver object in the computer code for the receiver function.

10. The non-transitory computer-readable medium of claim 9, wherein excluding function that do not functionally incorporate the receiver object comprises excluding functions that do not use an instance-specific variable of the receiver object in the function.

11. The non-transitory computer-readable medium of claim 9, wherein excluding functions that do not functionally incorporate the receiver object comprises excluding functions that use only global variables of the receiver object in the function.

12. The non-transitory computer-readable medium of claim 9, wherein excluding functions that do not functionally incorporate the receiver object comprises excluding functions that include only pro forma uses of the receiver object.

13. The non-transitory computer-readable medium of claim 8, wherein identifying the set of receiver functions comprises identifying receiver functions from the set of called functions.

14. The non-transitory computer-readable medium of claim 8, wherein the error indicates the candidate call site recites a nontrivial use of the receiver object.

15. A system comprising:
a processor configured to execute instructions;
a non-transitory computer-readable medium including instructions for execution by the processor, the instructions causing the processor to:
identify a set of functions in computer code in a programming language for execution by a computer, the programming language of the computer code permitting the use of receiver objects for functions in the programming language without explicitly specifying the receiver object;
generate a callgraph for the set of functions in the computer code, the callgraph identifying a set of function call sites in the set of functions and for each function call site a set of called functions that could be invoked from the function call site during execution of the computer code by the computer, wherein the callgraph is generated for each function call site by identifying possible functions for the call site and iteratively determining additional possible functions based on the identified possible functions;
identify a set of receiver functions that recite a receiver object in the function;
identify, from the set of function call sites, a set of candidate function call sites that include a receiver function of the set of receiver functions in the set of called functions identified in the callgraph for the function call site;
determine whether each candidate function call site in the set of candidate function call sites specifies a receiver object parameter; and
for each candidate function call site, identify an error in the computer code at each candidate function call site when the candidate function call site does not specify a receiver object parameter.

16. The system of claim 15, wherein identifying the set of called functions comprises filtering the set of receiver functions to exclude functions that do not functionally incorporate the receiver object in the computer code for the receiver function.

17. The system of claim 16, wherein excluding function that do not functionally incorporate the receiver object comprises excluding functions that do not use an instance-specific variable of the receiver object in the function.

18. The system of claim 16, wherein excluding functions that do not functionally incorporate the receiver object comprises excluding functions that use only global variables of the receiver object in the function.

19. The system of claim 16, wherein excluding functions that do not functionally incorporate the receiver object comprises excluding functions that include only pro forma uses of the receiver object.

20. The system of claim 15, wherein identifying the set of receiver functions comprises identifying receiver functions from the set of called functions.

* * * * *